US008523502B2

(12) United States Patent
Krassort

(10) Patent No.: US 8,523,502 B2
(45) Date of Patent: Sep. 3, 2013

(54) TRANSPORT WAGON PARTICULARLY FOR AGRICULTURAL CARGO

(76) Inventor: Georg Krassort, Harsewinkel (DE)

(*) Notice: Subject to any disclaimer, the term of this patent is extended or adjusted under 35 U.S.C. 154(b) by 311 days.

(21) Appl. No.: 12/597,508

(22) PCT Filed: May 2, 2008

(86) PCT No.: PCT/EP2008/003551
§ 371 (c)(1),
(2), (4) Date: Nov. 13, 2009

(87) PCT Pub. No.: WO2008/135236
PCT Pub. Date: Nov. 13, 2008

(65) Prior Publication Data
US 2010/0178128 A1  Jul. 15, 2010

(30) Foreign Application Priority Data
May 3, 2007 (DE) .......................... 10 2007 020 735

(51) Int. Cl.
B60P 7/135 (2006.01)
B60P 1/00 (2006.01)
B60P 7/06 (2006.01)
B65D 63/00 (2006.01)

(52) U.S. Cl.
USPC .......................................... 410/117; 410/121

(58) Field of Classification Search
USPC ................. 410/117, 145, 144, 131, 129, 127;
298/18, 17.5, 17.6, 17.7; 414/24.5, 24.6, 414/111, 470
See application file for complete search history.

(56) References Cited

U.S. PATENT DOCUMENTS

| 2,496,388 | A   |   | 2/1950  | Gilbey                |
|-----------|-----|---|---------|-----------------------|
| 2,739,836 | A   | * | 3/1956  | Kilpatrick ........................ 298/18 |
| 3,257,145 | A   | * | 6/1966  | Case et al. ...................... 296/14 |
| 3,964,791 | A   | * | 6/1976  | Griffis ............................. 298/11 |
| 4,500,242 | A   | * | 2/1985  | Beikman ...................... 414/24.5 |
| 5,588,711 | A   | * | 12/1996 | Hall ............................... 298/18 |
| 6,478,522 | B2  | * | 11/2002 | Babb ........................... 414/24.5 |
| 6,537,008 | B1  |   | 3/2003  | Haring                 |
| 6,834,917 | B2  | * | 12/2004 | Hanna ........................... 298/1 A |
| 7,207,631 | B1  | * | 4/2007  | Schwinbt ......................... 298/7 |

FOREIGN PATENT DOCUMENTS

| DE | 1 802 040    |    | 6/1970  |
|----|--------------|----|---------|
| DE | 3312585      | A1 | 10/1984 |
| DE | 20022895     |    | 6/2002  |
| EP | 0043178      | A  | 1/1982  |
| EP | 0 445 424    | A1 | 9/1991  |
| GB | 1244778      | A  | 9/1971  |
| GB | 2 219 258    | A  | 12/1989 |

* cited by examiner

Primary Examiner — Glenn Dayoan
Assistant Examiner — Sunsurraye Westbrook
(74) Attorney, Agent, or Firm — Gudrun E. Huckett

(57) ABSTRACT

The invention relates to a transport wagon for receiving cargo, particularly made of agricultural harvest products, such as bales pressed from straw or silage. Such wagons comprise a loading platform, which extends beneath the cargo and is delimited by longitudinal and lateral side parts, wherein the transport chamber is accessible, particularly when the longitudinal side walls are opened. According to the invention, at least one of the longitudinal side walls is provided with a support device, by means of which the longitudinal side wall can be displaced from an open position close to the ground into a closed position, in which it captures at least one upper layer of the stacked cargo and secures it laterally.

20 Claims, 4 Drawing Sheets ial cargo

TRANSPORT WAGON PARTICULARLY FOR AGRICULTURAL CARGO

BACKGROUND OF THE INVENTION

The invention concerns a transport wagon for cargo in particular of agricultural harvested goods such as bales pressed of straw or silage, with a load platform supporting the cargo and delimited by longitudinal as well as transverse lateral parts, wherein its transport space is accessible in particular when the longitudinal sidewalls are open. Such transport wagons, aside from cargo of agricultural harvested goods, in particular in the form of compressed round bales, can also be used for compressed paper waste, plastic bales, or like materials.

According to DE 33 12 585 A1 a transport system is provided for compressed bales that are present in round or parallelepipedal shape and comprised of compressed raw feed or the like harvested goods. On a transport wagon several bale receiving boxes are provided that receive the round bales in an ordered structure. In these boxes the round bales, on the one hand, can be transported and, on the other hand, the system is designed such that the boxes combined to a container also can be used for storing the round bales until they are being used in accordance with their purpose.

DE 200 22 895 discloses a transport wagon that is configured as a collecting vehicle that has at its rear a receiving device for the cargo from where the pieces that are particularly embodied as silage bales can be transported onto a load platform delimited by stationary sidewalls wherein for this transport a special roller table is provided in the area of the load platform. As a result of these additional components the utilizable transport space is disadvantageously limited.

The invention concerns the problem of providing a transport wagon for agricultural cargo with which, in adaptation to traffic regulations, a maximized cargo volume can be received so that high transport quotas are possible and, in the area of the load platform, cargo securing adaptable to different loading states can be achieved with minimal expenditure.

SUMMARY OF THE INVENTION

The invention solves this problem by a transport wagon wherein at least one of the longitudinal sidewalls has a support device by means of which the longitudinal sidewall is movable from a ground-near open position into at least one closed position in which at least one upper layer of the stacked cargo is engaged and laterally secured.

At least one of the longitudinal sidewalls is lowerable by means of the support device to a position substantially completely below the plane of the load platform and adjacent to it and from this lowered position is pivotable upwardly into a closed position in which only the uppermost layer of the multi-layer cargo is engaged.

The longitudinal sidewall interacts with at least one securing element that additionally secures for a multi-layered cargo at least the lower layer(s).

As the support device two assemblies interact that each engage one end of the longitudinal sidewall and the assemblies are supported in the area of the transverse sidewall, respectively.

The support device and the securing element is/are operable by hand or by means of at least one drive member.

As longitudinal sidewalls clamping gates are provided that are configured each with buckling-resistant rod elements and the clamping gates in the area of the terminal support device each have a support linkage.

The longitudinal sidewalls each have at the lower edge of the clamping gate the securing element extending to the edge area of the load platform.

The clamping gate is pivotable upwardly out of the ground-near loading position by means of a hydraulic drive into adjustable contact positions on the cargo, wherein the securing element can be entrained and in this way the multi-layer cargo stacked on the load platform, in particular in the form of round bales, is properly secured for transport.

The clamping gate and the securing element are adjustable continuously by means of the support device in such a way that the respective contact position can be matched to clamping conditions in accordance with the size of the cargo.

The securing element is comprised of flexible clamping parts such as tarpaulins, ropes, straps, nets or the like.

The securing element is adjustable and securable by hand or is adjustable by means of a drive.

The securing element is configured as a sidewall that is movable independent of the clamping gate. The sidewall is foldable by hand.

The two support linkages interacting as support device comprise components that are positioned substantially mirror-symmetrical to the longitudinal center plane of the transport wagon.

As a support linkage two guide rods are provided, respectively, that form a parallelogram and each pair of the guide rods has correlated therewith a hydraulic cylinder as a drive member.

The support linkages each are provided with a support beam extending vertically in the longitudinal center plane on which support beam, at an appropriate vertical distance, the two guide rods as well as the drive member are secured pivotably.

In accordance with the present invention, the transport wagon provided with sidewalls that can be moved into open position has in the area of at least one of the longitudinal sidewalls an improved support device with whose lifting linkage provided with a drive the cargo that forms a multi-layered stack can be engaged by the longitudinal sidewall in such a way that an additional lateral clamping fixation is achieved. By means of a variable controllable pivoting and lifting movement in particular the upper layer of the stack can be positionally precisely engaged and laterally pressed so that in this way for a maximum load height on the platform permitted for traffic a greater stability of the stack is achieved and risks as well as loss of cargo are avoidable.

In particular, both longitudinal sidewalls connected to the at least one support device can be placed against the cargo pieces like a clamping gate by synchronous movement. In this pressing or clamping position only a partial area of the lateral surfaces of the multi-layer stacked cargo is engaged on the transport wagon. In an upper contact position, a free space is generated laterally in the lower area between the clamping gate and the platform where pieces of the cargo stack are openly and laterally accessible. In an inventive further embodiment of the clam ping construction with the clamping gate additional securing elements are provided in the area of the free space. In an expedient embodiment they can interact with the longitudinal sidewalls or the support device/devices.

As securing elements, in particular flexible clamping parts are provided in this connection that upon movement of the clamping gate into the upper closed position are entrained and in this way substantially completely placeable laterally against the stacked cargo. In this way, for the lower layers of cargo an additional securing action is provided. With this embodiment of the securing elements it is possible to also load the transport wagon in such a way that the load projects past the constructively predetermined width of the load platform so that, for example, two stacks of round bales or similar cargo pieces positioned parallel to the longitudinal center plane of the transport wagon are transportable and the lateral securing elements prevent reliably a displacement of cargo out of a stack transversely to the traveling direction even when maneuvering a curve.

BRIEF DESCRIPTION OF THE DRAWINGS

Further details and advantageous embodiments of the invention result from the drawing in which two embodiments of the transport wagon according to the invention are illustrated. The drawings show in.

DESCRIPTION OF PREFERRED EMBODIMENTS

Figure 1:
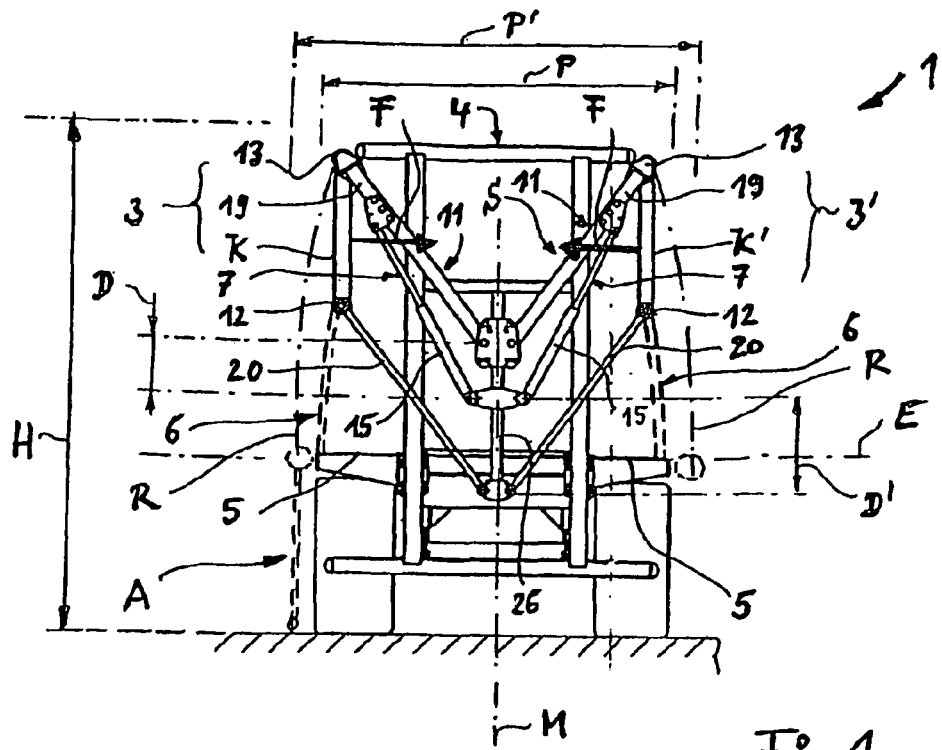
FIG. 1 a rearview of a transport wagon according to the invention with longitudinal sidewalls positioned in an upper closed position.
Figure 2:
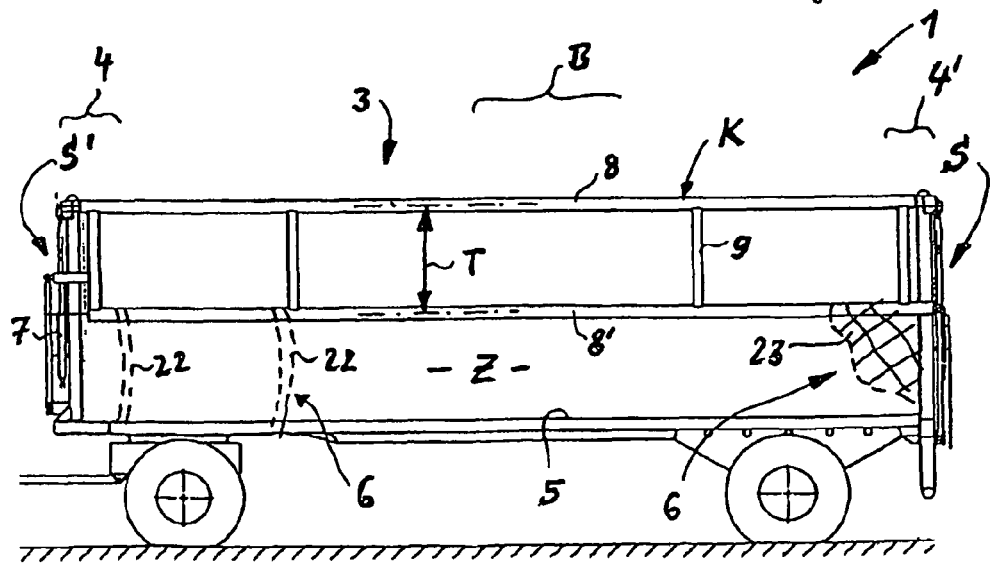
FIG. 2 a side view of the transport wagon according to FIG. 1.

In FIG. 1 a transport wagon identified as a whole by 1 is illustrated for agricultural cargo. On its load platform 5 the cargo in the form of straw, silage or similar harvested goods can be received in the form of compressed round bales 2 (FIG. 2). The transport wagon 1 has a load platform 5 that supports the cargo 2 stacked in several layers L, L' for transport and is delimited by longitudinal and transverse lateral parts 3, 3', 4, 4'. The transport space that is defined above the load platform 5 is accessible in generally known transport wagons 1 in that its longitudinal sidewalls (similar to the walls 3, 3') can be folded down laterally (similar to position A, dashed line illustration according to FIG. 1 or arrow G according to FIG. 9).

Figure 9:
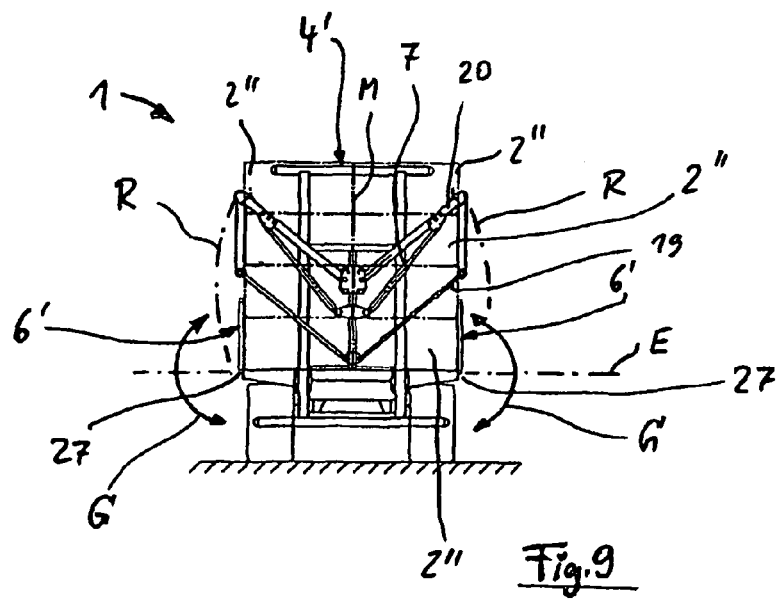
FIG. 9 a rear view of the transport wagon according to FIG. 8.

According to the invention the transport wagon 1 in the area of at least one of the sidewalls 3, 3' (in the illustrated embodiment both walls 3, 3') is provided with a support device S by means of which the longitudinal sidewalls 3, 3', starting from an open position A (for loading), are movable (on a movement path in accordance with dash-dotted line R; FIG. 1, FIG. 9) into a closed position (FIGS. 2 to 4; position B) in which at least one upper layer L (FIG. 3) of the stacked cargo 2 is engaged and laterally secured in this way.

Figure 3:
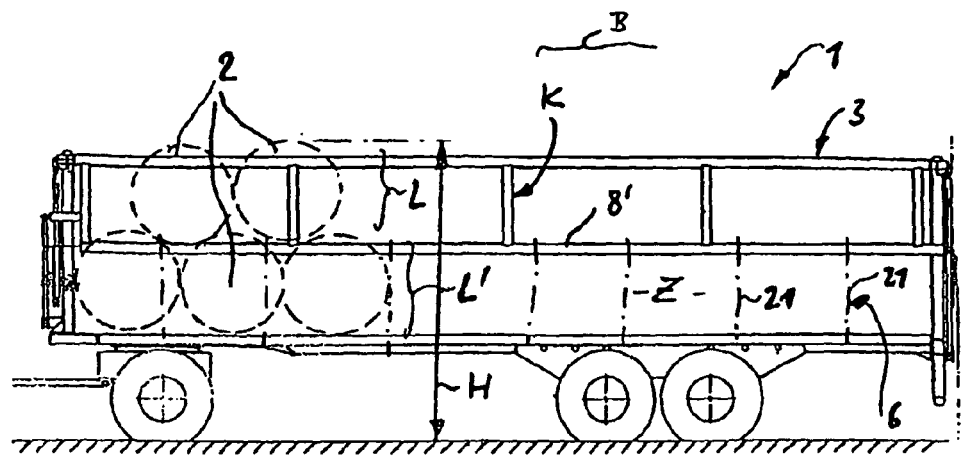
FIG. 3 a side view of a second embodiment of the transport wagon with movable sidewalls.
Figure 4:
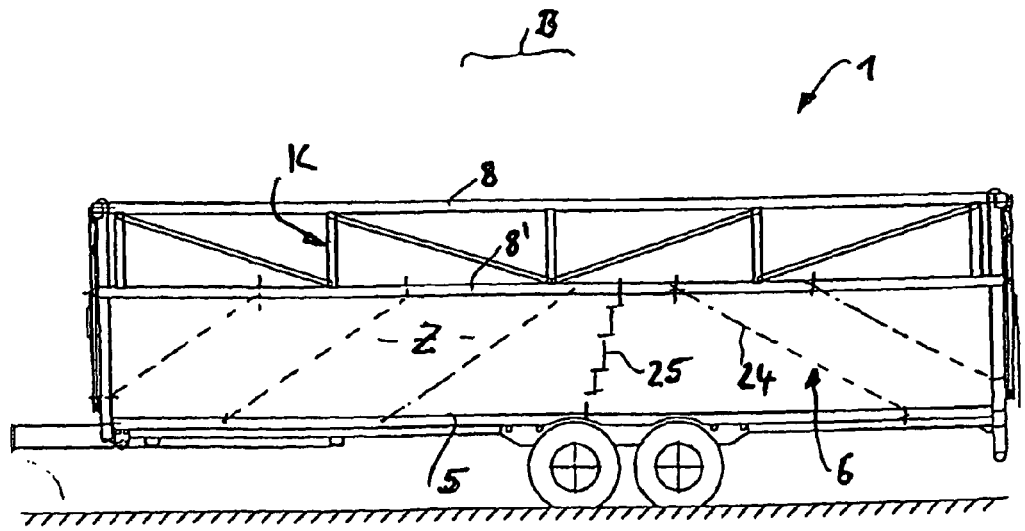
FIG. 4 a side view similar to FIG. 3 with a third embodiment of the transport wagon.

A weight-optimized narrow embodiment (width T, FIG. 2) of the longitudinal sidewalls 3, 3' in lightweight construction with few components provides that these grid-like walls by means of support device S can be lowered substantially completely to a position below the plane E of the load platform 5 adjacent to the transport wagon 1 and, out of this lowered position A, can be pivoted upwardly such that only the uppermost layer L of the multi-layer cargo 2 is directly engaged by the narrow grid construction (in the area T) in the illustrated closed position (FIGS. 2 to 4).

These longitudinal sidewalls 3, 3' however create a zone Z below the longitudinal sidewalls 3, 3' in the closed position that remains "free" so that in this area there is the risk that the cargo that is located in a lower or middle layer L' (FIG. 3) may slide out laterally, for example, when maneuvering a curve. Therefore, the concept according to the invention with longitudinal sidewalls 3, 3' that are pivotable on the path R also provides that below the longitudinal sidewalls 3, 3' a securing element referenced generally by 6 is provided, respectively, that engages additionally at least the lower layer L' in case of a multi-layer cargo L, L' (FIG. 2).

The side views according to FIGS. 2 to 4 illustrate this combination wherein as a support device S, S' two assemblies interact that each engage one end of the longitudinal sidewalls 3, 3'. They are supported in particular in the area of the respective transverse sidewalls 4, 4' (FIG. 2). It is conceivable that these assemblies with the support devices S, S' can be operated by hand. It has been found to be expedient however to provide drive members referenced generally at 7, 7' at least on one of the assemblies.

With this functional assembly connection S, S' and 7, 7' in the area of the longitudinal sidewalls 3, 3' a pivoting and clamping system is formed in which the walls 3, 3' provided with bucking-resistant rod elements 8, 8' and 9 are each acting like a clamping gate K, K', respectively (arrow F, FIG. 1). These clamping gates K, K' each have at the other end in the area of the supporting assemblies of the support device S respective connecting joints 12 and 13 wherein a support linkage generally identified at 11 is provided with guides 19, 20 acting as a parallelogram linkage, respectively.

It is understood in this connection that these longitudinal sidewalls 3, 3' each are provided, preferably at the lower edge of the clamping gate K, K' in the area of their horizontal rod 8', with the securing elements 6 extending toward the edge area of the load platform 5 (FIGS. 2 through 4).

In this connection, the clamping gates K, K' are pivotable upwardly from a ground-near loading position (lower position A, FIG. 1) by means of a hydraulic drive 15 provided as a drive member 7 and actuated by the tractor (not illustrated) into a respective pre-selectable contact position on the cargo 2. In this connection, the respective securing elements 6 can be entrained such that cargo 2 stacked in several layers on the load platform 5, in particular in the form of round bales, is secured properly for transport with respect to all layers. The drive concept 7 can be designed such that the clamping gates K, K' and the securing element 6 by means of the at least one support device S can be adjusted together continuously.

The securing elements 6 are in particular in the form of flexible tensioning parts. In an exemplary fashion, tarpaulins, ropes 21 (FIG. 3), straps 22 (FIG. 2) or nets 23 (FIG. 2) are illustrated. In FIG. 4, foldable profiled sections identified by 24 and telescoping or foldable elements at 25 are illustrated as further conceivable embodiments. It is also conceivable that the securing elements 6 moved into the tensioned position are adjustable subsequently by hand. In this connection, the securing elements 6 can also be individually or jointly adjustable by means of a drive, not illustrated in detail.

The end view according to FIG. 1 illustrates that the two assemblies acting as support device S, S' each have a support linkage 11 arranged substantially mirror-symmetrical to the longitudinal center plane M of the transport wagon 1. As a support linkage 11 the guides 19, 20 are provided that together form a parallelogram, respectively, and each of these pairs has correlated therewith a hydraulic cylinder 15 as a drive member 7. In this respect, the support linkages 11 each have a support beam 26 extending vertically within the longitudinal center plane M and secured on the parts of the transverse sidewalls 4, 4' on which, with corresponding vertical spacing D, D', the two guides 19, 20 as well as the hydraulic drive members 7 are secured pivotably on hinges that are illustrated schematically by points. This support system is designed conceptually such that components moved on an optimal movement path R effect a reliable clamping action of the cargo 2.

Figure 6:
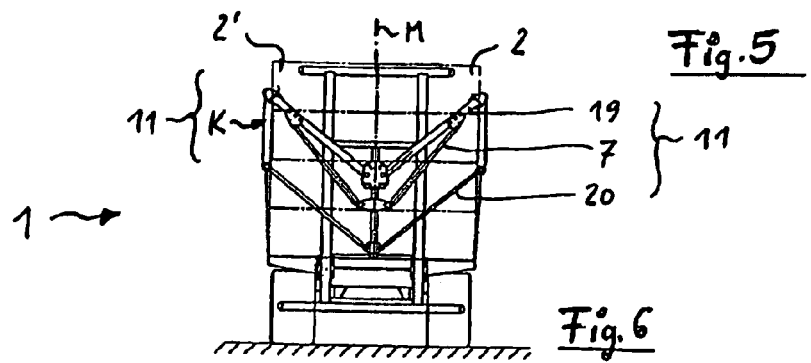
FIG. 6 a rear view of the loaded transport wagon according to FIG. 6.
Figure 8:
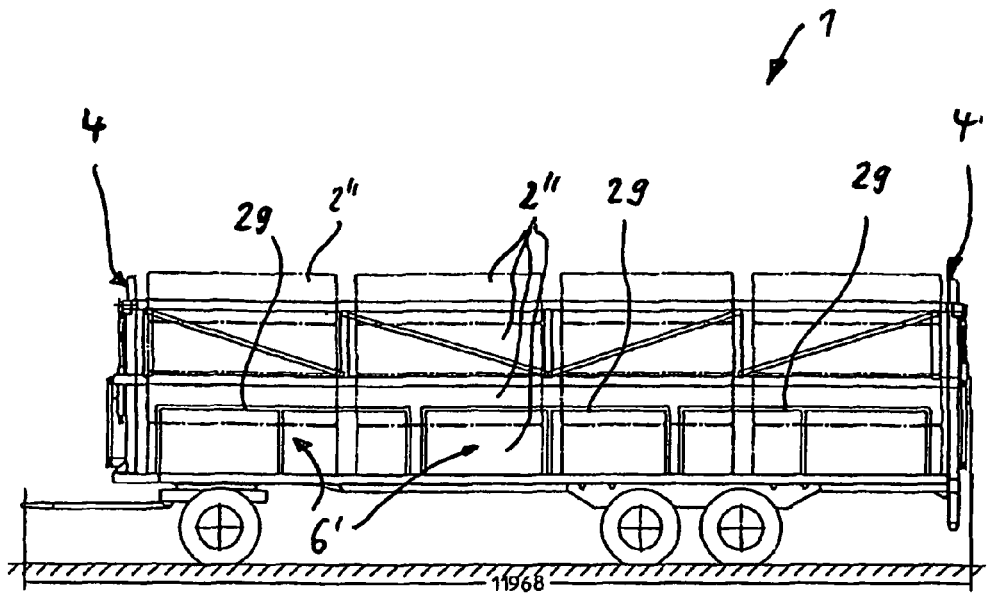
FIG. 8 a side view similar to FIG. 7 with a multi-part embodiment of the sidewall in the longitudinal direction.

The movement path R that is followed by the two clamping gates K, K' by means of the support devices S, S' is illustrated by an arc. By means of arrow H a measure for a conceivable maximum loading height (for example, 4 m) of the load wagon 1 is illustrated. When the load wagon 1 travels empty, it has a width that matches the width P in accordance with traffic regulations (for example, 2.55 m) and in the loaded state the system may have a loading width P' (for example, 3 m) so that in the traveling direction stacking of correspondingly long cargo pieces 2, 2' and 2" is possible (FIG. 6, FIG. 8) on either side of the longitudinal center plane M.

Figure 5:
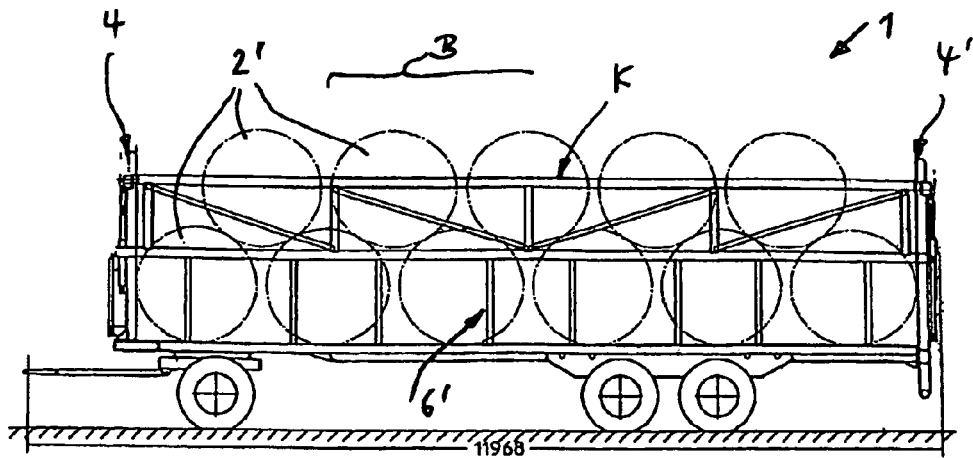
FIG. 5 a side view similar to FIG. 3 with a securing element that is embodied as a sidewall.

In FIG. 5 the embodiment of the securing element 6' as a wall that is movable independent of the gate K, K' is illustrated that can be pivoted in the direction of arrow G (FIG. 9) about an appropriate hinge 27. This sidewall securing means 6' can be embodied as a tube frame 28 that is movable by hand or by a drive, a force storage means, or a similar assisting means (not illustrated). In the simplest case the securing elements 6' may be operated by hand and secured in the closed position by a connector. In the embodiment according to FIG. 6 the securing element 6' is comprised of several wall elements 29 that are separate in the longitudinal direction.

Figure 7:
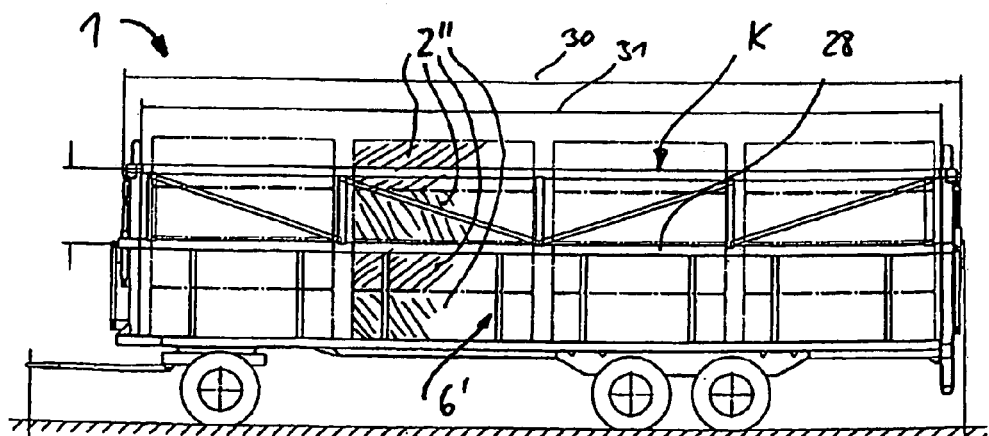
FIG. 7 a side view similar to FIG. 5 with parallelepipedal cargo pieces on the load platform.

Aside from transporting bales 2, 2' of varying dimensions as cargo, the transport wagon 1 that has a length 30 and useable space length 31 (FIG. 7) may receive properly secured also parallelepipedal pieces such as pressed bales 2", boxes or pallets. Also, receiving waste bales, straw pellets, pressed saw chips, bales of peat, packages in the form of bags, paper bales and like cargo is conceivable. A multi-layered stacking of the cargo 2" (FIG. 7, different cross-hatching) shows the effect of the clamping gate K in the area of the upper layers, and the lower layers are engaged by the respective securing elements 6, 6'. In this way, it is ensure that transport wagons 1 with only partially filled receiving space, for example, only one lower layer and a few cargo pieces in the second layer, can be used sufficiently safe in traffic and sufficiently safe with respect to losing transport goods.

What is claimed is:

1. A transport wagon for cargo, the transport wagon comprising:
    a load platform;
    longitudinal sidewalls and transverse sidewalls delimiting laterally the load platform and defining a transport space;
    wherein the transport space is accessible when at least one of the longitudinal sidewalls is open;
    wherein the at least one longitudinal sidewall has a support device by means of which the at least one longitudinal sidewall is movable from a ground-near open position into at least one closed position in which at least one upper layer of cargo stacked in several layers on the load platform is engaged and laterally secured by the at least one longitudinal sidewall by lateral clamping fixation;
    wherein the at least one longitudinal sidewall has a bottom lower edge and a top edge, wherein a free space is provided between the load platform and the bottom lower edge of the at least one longitudinal sidewall in said at least one closed position in which the bottom lower edge is positioned above the load platform.

2. The transport wagon according to claim 1, wherein the at least one longitudinal sidewall is lowerable by the support device to a lowered position adjacent to and substantially completely below a plane of the load platform, wherein the at least one longitudinal sidewall is pivotable upwardly from the lowered position into the at least one closed position in which only the uppermost layer of the cargo stacked in several layers is engaged, wherein the at least one longitudinal sidewall is moved in upright position on an arcuate path from the lowered position into the at least one closed position and vice versa.

3. The transport wagon according to claim 1, comprising at least one securing element interacting with the at least one longitudinal sidewall and additionally securing at least the lower layer or layers of the cargo stacked in several layers.

4. The transport wagon according to claim 3, wherein the support device comprises two interacting assemblies each engaging one end of the at least one longitudinal sidewall, respectively, wherein the assemblies are supported on the transverse sidewalls, respectively.

5. The transport wagon according to claim 4, wherein the support device and the at least one securing element are operated by hand or by at least one drive member.

6. The transport wagon according to claim 1, wherein the support device comprises two interacting assemblies each engaging one end of the at least one longitudinal sidewall, respectively, wherein the assemblies are supported on the transverse sidewalls, respectively.

7. The transport wagon according to claim 1, wherein the support device is operated by hand or by at least one drive member.

8. The transport wagon according to claim 1, wherein the at least one longitudinal sidewall is a clamping gate configured of buckling-resistant rod elements, wherein one of the rod elements forms the bottom lower edge of the at least one longitudinal sidewall, wherein the clamping gate has support linkages in the area of the support device, respectively.

9. The transport wagon according to claim 8, comprising at least one securing element attached to the bottom lower edge, wherein the at least one securing element extends to the edge area of the load platform.

10. The transport wagon according to 9, comprising a hydraulic drive connected to the clamping gate, wherein the clamping gate is pivotable upwardly from the ground-near open position by the hydraulic drive into adjustable contact positions on the cargo, wherein the at least one securing element is entrained by the clamping gate so that the cargo stacked in several layers is properly secured for transport.

11. The transport wagon according to claim 9, wherein the clamping gate and the at least one securing element are adjustable continuously by the support device into adjustable contact positions on the cargo, wherein the contact position are matched to clamping conditions in accordance with size of the cargo.

12. The transport wagon according to 8, comprising a hydraulic drive connected to the clamping gate, wherein the clamping gate is pivotable upwardly from the ground-near open position by the hydraulic drive into adjustable contact positions on the cargo.

13. The transport wagon according to claim 1, comprising at least one securing element interacting with the at least one longitudinal sidewall and additionally securing in the free space between the load platform and the bottom lower edge at least the lower layer or layers of the cargo stacked in several layers, wherein the at least one securing element is comprised of flexible clamping parts selected from the group consisting of tarpaulins, ropes, straps, and nets.

14. The transport wagon according to claim 13, wherein the at least one securing element is adjustable and securable by hand.

15. The transport wagon according to claim 13, wherein the at least one securing element is adjustable by a drive.

16. The transport wagon according to claim 13, wherein the at least one securing element is configured as a separate sidewall that is movable independent of the at least one longitudinal sidewall that is comprised of a clamping gate.

17. The transport wagon according to claim 16, wherein the separate sidewall is foldable by hand.

18. The transport wagon according to claim 1, wherein the longitudinal sidewalls each have said support device, said support device comprising a linkage at each one of said transverse sidewalls, wherein said linkages are positioned substantially mirror-symmetrical to a longitudinal center plane of the transport wagon.

19. The transport wagon according to claim 18, wherein said linkages each comprise two guide rods, respectively, that form a parallelogram, wherein the two guide rods have correlated therewith a hydraulic cylinder as a drive member.

20. The transport wagon according to claim 19, wherein said linkages are connected to a support beam extending vertically in a longitudinal center plane, wherein the two guide rods and the hydraulic cylinder are pivotably connected to the support beam, respectively, at an appropriate vertical distance relative to one another.

* * * * *